United States Patent [19]

Nakamura

[11] Patent Number: 5,554,319
[45] Date of Patent: Sep. 10, 1996

[54] PHOSPHOR

[75] Inventor: Takashi Nakamura, Kanagawa, Japan

[73] Assignee: Fuji Photo Film Co., Ltd., Kanagawa, Japan

[21] Appl. No.: 389,688

[22] Filed: Feb. 16, 1995

Related U.S. Application Data

[63] Continuation of Ser. No. 263,220, Jun. 17, 1994, abandoned, which is a continuation of Ser. No. 134,370, Oct. 12, 1993, abandoned, which is a continuation of Ser. No. 1,242, Jan. 6, 1993, abandoned, which is a continuation of Ser. No. 885,058, May 14, 1992, abandoned, which is a continuation of Ser. No. 774,171, Oct. 15, 1991, abandoned, which is a continuation of Ser. No. 666,449, Mar. 11, 1991, abandoned, which is a continuation of Ser. No. 541,392, Jun. 21, 1990, abandoned.

[30] Foreign Application Priority Data

Jun. 22, 1989 [JP] Japan .................................. 1-160213

[51] Int. Cl.$^6$ .................................................. C09K 11/86
[52] U.S. Cl. ............................................... 252/301.4 H
[58] Field of Search ................................ 252/301.4 H

[56] References Cited

U.S. PATENT DOCUMENTS

| | | | |
|---|---|---|---|
| 4,029,851 | 6/1977 | Degenhardt | 252/301.4 H |
| 4,076,897 | 2/1978 | Joiner | 252/301.4 H |
| 4,261,854 | 4/1981 | Kotera et al. | 252/301.4 H |
| 4,539,137 | 9/1985 | Kohda et al. | 252/301.4 H |
| 5,003,182 | 3/1991 | Umemoto et al. | 252/301.4 H |

FOREIGN PATENT DOCUMENTS

| | | | |
|---|---|---|---|
| 2542481 | 4/1976 | Germany | 252/301.4 H |
| 3242399 | 5/1984 | Germany | 252/301.4 H |

*Primary Examiner*—Melissa Bonner
*Attorney, Agent, or Firm*—Sixbey, Friedman, Leedom & Ferguson

[57] ABSTRACT

Disclosed is a novel phosphor produced by adding Li, K, In, Al, Ga, Bi, Sm, Cu, Mg, Cs, Tl, Zn, Pb or Hf to a cerium activated rare earth oxyhalide phosphor having the following formula (I):

$$LnOX:xCe \qquad (I)$$

in which Ln is Y, La, Gd or Lu; X is Cl, Br or I; and x is $0 < x \leq 0.2$, and a ratio of X/Ln is $0.500 < X/Ln \leq 0.998$ by atomic ratio, and the maximum peak ($\lambda$) of the stimulation spectrum of the phosphor is 550 nm$<\lambda<$700 nm.

9 Claims, 1 Drawing Sheet

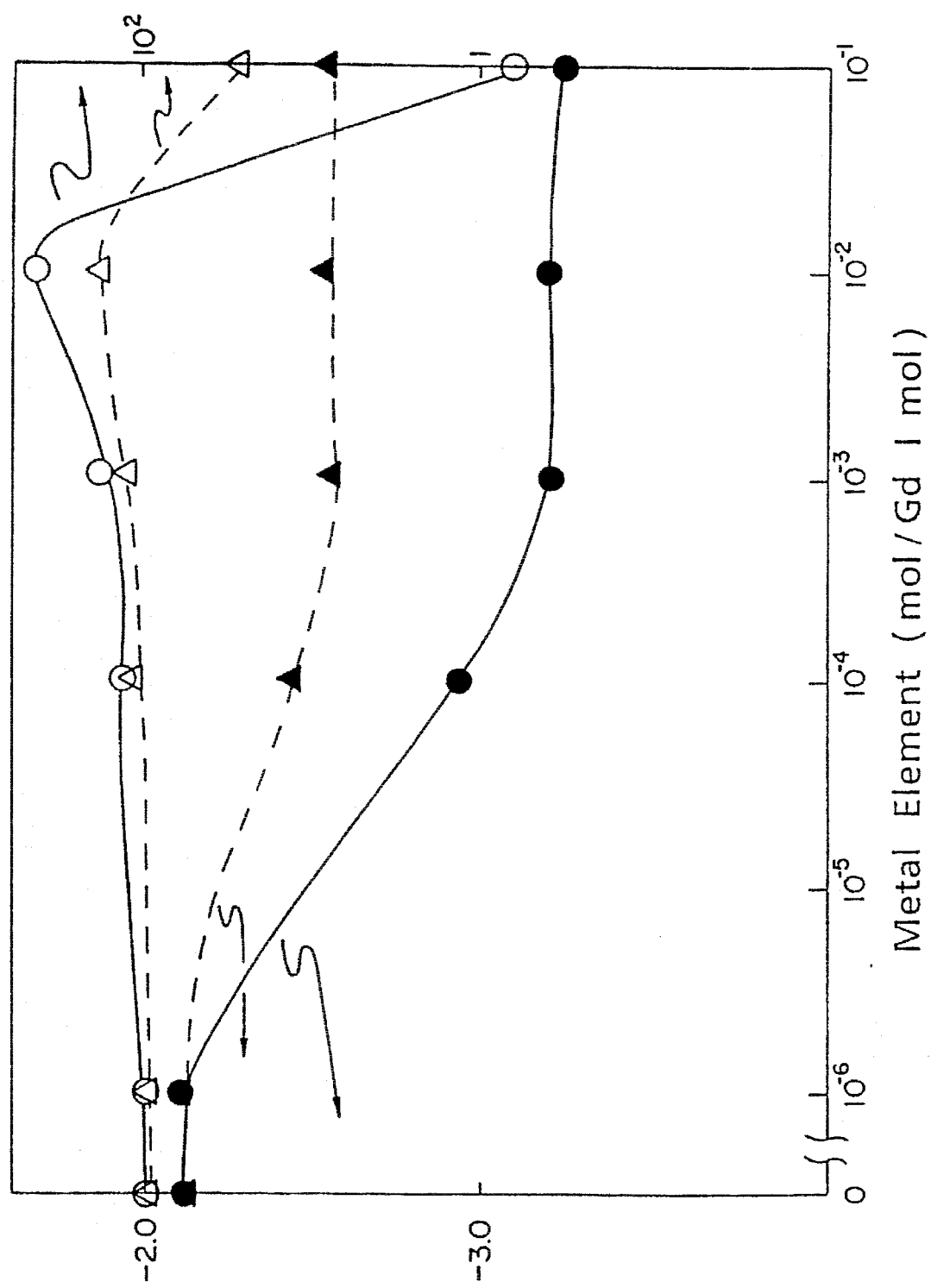

PHOSPHOR

This application is a Continuation of Ser. No. 08/263,220, filed Jun. 17, 1994, now abandoned; which was a continuation of Ser. No. 08/134,370, filed Oct. 12, 1993, now abandoned; which was a continuation of Ser. No. 08/001,242, filed Jan. 6, 1993, now abandoned; which was a continuation of Ser. No. 07/885,058, filed May 14, 1992, now abandoned; which was a continuation of Ser. No. 07/774,171, filed Oct. 15, 1991, now abandoned; which was a continuation of Ser. No. 07/666,449, filed Mar. 11, 1991, now abandoned; which was a continuation of Ser. No. 07/541,392, filed Jun. 21, 1990, now abandoned.

BACKGROUND OF THE INVENTION

1. Field of the Invention

The present invention relates to a cerium activated rare earth oxyhalide phosphor. Particularly, this invention relates to a cerium activated rare earth oxyhalide phosphor improved in afterglow characteristics.

2. Description of Prior Art

It has been heretofore known that a cerium activated rare earth oxyhalide phosphor having the following formula:

$$LnOX:xCe$$

in which Ln is at least one rare earth element selected from the group consisting of Y, La, Gd and Lu; X is at least one halogen selected from the group consisting of Cl, Br and I; and x is a number satisfying the condition of $0 < x \leq 0.2$, can be employed as a phosphor for a radiographic intensifying screen, since the phosphor gives an emission (spontaneous emission) in the blue light region with the maximum at a wavelength of approx. 380–400 nm when excited with a radiation such as X-rays. Recently, it has been discovered that said cerium activated rare earth oxyhalide phosphor emits light in the blue region when excited with an electromagnetic wave having a wavelength within the region of 450–900 nm after exposure to a radiation such as X-rays, that is, the phosphor gives stimulated emission. Because of the stimulability thereof, the cerium activated rare earth oxyhalide phosphor has been paid much attention and investigated as a phosphor for a radiation image storage panel employable in a radiation image recording and reproducing method utilizing a stimulable phosphor.

The radiation image recording and reproducing method utilizing a stimulable phosphor can be employed in place of the conventional radiography utilizing a combination of a radiographic film and an intensifying screen. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably small dose, as compared with the conventional radiography. Accordingly, the radiation image recording and reproducing method is of great value, especially when the method is used for medical diagnosis.

The radiation image storage panel employed for the above-described method generally comprises a support and a stimulable phosphor layer provided on one surface of the support. However, if the phosphor layer is self-supporting, the support may be omitted. Further, a transparent film of a polymer material is generally provided on the free surface (surface not facing the support) of the phosphor layer to protect the phosphor layer from chemical deterioration or physical shock.

The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

The operation of reading out the radiation energy-stored image is generally carried out by the steps of scanning the panel with a laser beam (stimulable rays) to sequentially excite the stimulable phosphor so as to release the radiation energy stored therein as light emission and detecting the light by a photosensor.

In the last step of the read-out operation, the light which is continuously emitted by the stimulable phosphor of the radiation image storage panel after terminating the excitation with stimulating rays (namely, afterglow of stimulated emission) causes the decrease of S/N ratio of the resulting image. In more detail, the afterglow given by the phosphor particles other than the phosphor particles aimed to excite is detected as the light emitted by the aimed ones in the case that the phosphor gives afterglow in a relatively high ratio to the amount of the stimulated emission. As a result, the image provided by the radiation image storage panel comprising such a stimulable phosphor tends to deteriorate on the image quality (sharpness, density resolution, etc.).

The afterglow characteristics of the panel varies depending not only on the employed stimulable phosphor but also on the scanning speed of the stimulating rays. In more detail, if the scanning speed is slow enough, the afterglow affects the image quality only in a negligible small degree. However, the image processing is desired to be rapidly carried out, so the scanning speed needs to be high. In this case, the afterglow of the stimulable phosphor considerably lowers the image quality. Therefore, it is desired that the amount of afterglow of the stimulable phosphor employed for the radiation image storage panel be made as small as possible. In other words, it is desired that the stimulated emission cease as soon as the excitation with the stimulating rays terminates.

When a radiation image storage panel containing a stimulable phosphor is employed in radiography for medical diagnosis, it is also desired that the sensitivity of the panel to a radiation be made as high as possible to reduce the exposure dose for patient and to facilitate the procedure for converting the stimulated emission to electric signals. Accordingly, it is desired to make the luminance of stimulated emission of the phosphor employed for the panel as high as possible.

The cerium activated rare earth oxyhalide phosphor expressed by the above-described formula consists essentially of cerium as an activator and LnOX as a matrix crystal which has the PbFCl-type crystal structure and which is composed of rare earth element Ln, oxygen O and halogen X. The expression of LnOX in the above-described formula means that rare earth element Ln, oxygen O and halogen X together consist in a matrix crystal whose structure is the same as that of PbFCl crystal, and the expression does not mean that the atomic ratio of Ln, O and X is always 1:1:1 in the crystal.

Among the cerium activated rare earth oxyhalide phosphors expressed by the above-described formula, a phosphor of which ratio between Ln and X (X/Ln) satisfies the condition of $0.500<X/Ln\leq 0.998$ by atomic ratio has a maximum peak of the stimulation spectrum located at $\lambda$ which is satisfying the condition of 550 nm$<\lambda<$700 nm. The wavelength of the maximum peak of this phosphor ($\lambda$) is longer than those of other phosphors and matches with a radiation wavelength of He-Ne laser, which is generally employed for a stimulating light source. Therefore, the phosphor can absorb the stimulating ray sufficiently and its luminance of stimulated emission is considerably high. With respect to the above-mentioned phosphor, a radiation image recording and reproducing method and a radiation image storage panel employing the phosphor, the inventors have obtained U.S. Pat. No. 5,003,183.

The cerium activated rare earth oxyhalide phosphor described in the specification of U.S. Pat. No. 5,003,183 exhibits high luminance, and the radiation image storage panel employing the phosphor has high sensitivity. However, the amount of afterglow of the phosphor is considerably large and the image provided by the panel employing the phosphor is lowered on the image quality when the scanning speed of the stimulating rays is high. Therefore it is desired to improve the afterglow characteristics of the above-mentioned stimulable phosphor.

SUMMARY OF THE INVENTION

It is an object of the present invention to provide a cerium activated rare earth oxyhalide phosphor improved in the afterglow characteristics.

There are provided by the present invention a cerium activated rare earth oxyhalide phosphor having the following formula (I):

LnOX:xCe          (I)

in which Ln is at least one rare earth element selected from the group consisting of Y, La, Gd and Lu; X is at least one halogen selected from the group consisting of Cl, Br and I; and x is a number satisfying the condition of $0<x\leq 0.2$, and a ratio between said Ln and said X satisfy the condition of $0.500<X/Ln\leq 0.998$ by atomic ratio; and further containing, at least one metal element selected from the group consisting of Li, K, In, Al, Ga, Bi, Sm, Cu, Mg, Cs, Tl, Zn, Pb and Hf said phosphor having a maximum peak of a stimulation spectrum of the phosphor is located at $\lambda$ which is a wavelength satisfying the condition of 550 nm$<\lambda<$700 nm.

As described above, the expression of LnOX in the formula (I) means that rare earth element Ln, oxygen O and halogen X together constitute a matrix crystal whose structure is the same as that of the PbFCl crystal, and does not specifically mean that the atomic ratio of Ln, O and X is 1:1:1 in the crystal.

The present inventors have studied the afterglow characteristics of the phosphors produced by adding various metal elements to a cerium activated rare earth oxyhalide phosphor of which ratio of X/Ln is $0.500<X/Ln\leq 0.998$ by atomic ratio, and of which maximum peak ($\lambda$) of the stimulation spectrum is 550 nm$<\lambda<$700 nm. On the basis of this S study, the inventors have found that the afterglow characteristics of the phosphor can be improved by the addition of at least one metal element selected from the group consisting of Li, K, In, Al, Ga, Bi, Sm, Cu, Mg, Cs, Tl, Zn, Pb and Hf, and have also found that the addition of some metal elements, such as Ta and Sc, deteriorates the after-glow characteristics of the phosphor.

In the process for preparing the phosphor of the invention, the metal element (for example, in the oxide) is added to other phosphor materials. The ratio between rare earth Ln and halogen X of the aimed phosphor can be controlled by varying the relative amount of rare earth oxide and halogen donator (a preparation ratio) in a mixture of the starting materials containing the added metal element.

The phosphor of the present invention prepared in accordance with the above-mentioned process has improved afterglow characteristics as compared with the phosphor to which the metal element is not added.

BRIEF DESCRIPTION OF DRAWINGS

FIG. 1 shows relation between the afterglow characteristics and the amount of added metal element, and it also shows relation between the luminance of stimulated emission and the amount of added metal element. In FIG. 1, "○" and "△" represent the luminance of Sm added phosphor and Mg added phosphor, respectively. "●" and "▲" also represent the afterglow characteristics of Sm added phosphor and Mg added phosphor, respectively.

DETAILED DESCRIPTION OF THE INVENTION

The cerium activated rare earth oxyhalide phosphor of the present invention can be prepared, for instance, by a process described below.

As the starting materials for the preparation of the phosphor, the following materials can be employed:

(1) at least one rare earth oxide selected from the group consisting of $Y_2O_3$, $LA_2O_3$, $Gd_2O_3$ and $Lu_2O_3$, (in some cases the rare earth oxide may be replaced with such a rare earth compound as an oxalate or a carbonate which can be easily converted into the rare earth oxide by heating it at a high temperature);

(2) at least one halogen donator capable of donating at least one halogen selected from the group consisting of Cl, Br and I;

(3) at least one cerium compound (cerium halide, cerium oxide, cerium nitrate, cerium sulfate, etc.); and (4) at least one metal oxide selected from the group consisting of oxides of Li, K, In, Al, Ga, Bi, Sm, Cu, Mg, Cs, Tl, Zn, Pb and Hf, (in some cases the metal oxide may be replaced with such a compound as an oxalate or a carbonate which can be easily converted into the metal oxide by heating it at a high temperature).

Examples of the above-mentioned halogen donator (2) include ammonium halide ($NH_4X$), hydrogen halide(HX) in the form of an aqueous solution and a gas, and rare earth halide ($LnX_3$; in which X is any one of Cl, Br and I; and Ln is any one of Y, La, Gd and Lu). In the case of using the rare earth halide as a halogen donator, the halogen donator is to donate a portion or whole of the rare earth element which serves as a host component of the phosphor as well as the halogen also serving as the host component thereof.

The metal element to be added, will be described hereinafter.

The present invention is characterized by adding at least one metal element selected from the group consisting of Li, K, In, Al, Ga, Bi, Sm, Cu, Mg, Cs, Tl, Zn, Pb and Hf to the cerium activated rare earth oxyhalide phosphor, in order to improve the afterglow characteristics of the phosphor. Among these metal elements, Li, K, In, Al, Ga, Bi, Sm, Cu or Mg is preferably used, because they can improve the afterglow characteristics without lowering of the luminance of stimulated emission. Although other metal elements (namely, Cs, Tl, Zn, Pb or Hf) slightly lower the luminance, they are also employable for the invention. Because the slight lowering of the luminance can be compensated by increasing the intensity of the stimulating rays. However, Ta and Sc adversely affect the afterglow characteristics as compared with the characteristics of the phosphor to which the metal element is not added. On the other hand, Ca, Ba, Mn and Yb seriously lower the luminance of stimulated emission. Therefore these metal elements are not employable for the invention.

The amount of added metal element is determined depending upon the metal element employed, but is generally not more than $1 \times 10^{-1}$ mol, preferably not more than $4 \times 10^{-2}$ mol, per 1 mol of Ln in the formula (I). Also the amount of added element is generally not less than $10^{-6}$ mol, preferably not less than $10^{-5}$, per 1 mol of Ln in the formula (I). For example, in the case of Sm and Mg, as shown in FIG. 1, the afterglow characteristics is remarkably improved by the addition of the metal element when the amount of added element is not more than about $1 \times 10^{-4}$ mol. However, when the amount of the element is more than about $1 \times 10-4$ mol, the afterglow characteristics do not vary with the added amount of the metal element. On the other hand, the luminance of the stimulated emission is slightly enhanced by the addition of metal element when the amount of added element is not more than about $1 \times 10^{-2}$ mol, but when the amount of the element is more than about $1 \times 10^{-2}$ mol, the luminance is lowered by the addition.

In the process of the preparation for the phosphor of this invention, the ratio between rare earth Ln and halogen X is controlled by varying the relative amount of rare earth oxide and halogen donor (a preparation ratio) in the mixture of the starting materials. Therefore, it is preferable to use ammonium halide as halogen donor, which is easy to control the relative amount of rare earth oxide and halogen donor.

The process of the preparation for the phosphor of the present invention will be described in more detail with respect to an example of the case using ammonium halide as halogen donor.

In the first place, the above-mentioned starting materials (1) to (4) are mixed in an appropriate amount to prepare a mixture thereof. An amount of cerium compound (3) is determined stoichiometrically according to the formula (I). In more detail, the cerium compound is added to the mixture so that cerium atom in the mixture amounts to x mol per 0.5 mol (i.e., Ln 1 mol) of rare earth oxide $Ln_2O_3$.

The mixing procedure is carried out by means of a conventional mixing apparatus such as a variety of mixers, a V-type blender, a ball mill and a rod mill.

The mixture of phosphor materials can be prepared in the manner other than described above. For example, it can be prepared by the following procedure:

Oxalic acid is added to aqueous solution containing;

1') at least one rare earth ion selected from the group consisting of Y, La, Gd and Lu;

3') cerium ion; and

4') at least one metal ion selected from the group consisting of Li, K, In, Al, Ga, Bi, Sm, Cu, Mg, Cs, Tl, Zn, Pb and Hf. The resulting precipitate (mixture of oxalates of 1'), 3') and 4')) is collected and fired to obtain the mixture of oxides. Then ammonium halide is added to the resulting mixture of oxides (co-precipitation method).

The above-described methods are given by no means to restrict the method of adding the metal elements. Any other conventional method can be selected and employed according to the metal element employed.

The obtained mixture of the starting materials for the phosphor is placed in a heat-resistant container such as a quartz boat, an alumina crucible or a quartz crucible and fired in an electric furnace.

Before the firing procedure, the mixture of the starting materials for phosphor may be heat-treated at a temperature lower than the temperature for the firing in order to form a LnOX crystal beforehand.

The temperature for the firing suitably ranges from 500° to 1,500° C., and preferably ranges from 700° to 1,400° C. The firing period is determined depending upon the amount of the mixture of the starting materials or the heat-treated product thereof charged in the heat-resistant container, the firing temperature, etc. Generally, the firing period ranges from 0.5 to 20 hours, and preferably ranges from 1 to 3 hours.

As the firing atmosphere, there can be employed a weak reducing atmosphere such as a nitrogen gas atmosphere containing a small amount of hydrogen gas or a carbon dioxide gas atmosphere containing carbon monoxide gas, and inert atmosphere such as a nitrogen gas atmosphere and an argon gas atmosphere. In the case of using cerium (IV) compounds, a weak reducing atmosphere is employed for the firing procedure, and in the firing procedure, cerium (IV) is reduced to cerium (III).

The product obtained by the firing under the above-mentioned conditions is taken out of the furnace, allowed to stand for cooling and pulverized. The pulverized product may be again placed in the heat-resistant container and fired in the electric furnace. For conducting the second firing, there can be employed the above-mentioned weak reducing atmosphere or inert atmosphere.

The ratio between rare earth Ln and halogen X in the phosphor is controlled by varying the relative amount of rare earth oxide and halogen donor (a preparation ratio) in the mixture of the starting materials and/or by selecting the atmosphere in the firing stage. In the case of using ammonium halide as halogen donor, the ratio between rare earth Ln and halogen X in the phosphor is controlled by varying the relative amount of rare earth oxide $Ln_2O_3$ and ammonium halide $NH_4X$ in the mixture of the starting materials and/or by selecting the atmosphere in the firing stage in order that the ratio X/Ln satisfies the condition of $0.500 < X/Ln \leq 0.998$ by atomic ratio.

Preferably, the ratio X/Ln is not more than 0.995, and more preferably not more than 0.990 by atomic ratio, because such phosphor exhibits high luminance of stimulated emission. For the same reason, the ratio X/Ln is preferably not less than 0.700, and more preferably not less than 0.800 by atomic ratio.

After the firing is completed, the fired product is finely pulverized to obtain a powdery phosphor of the invention.

The powdery phosphor thus obtained may be processed in a conventional manner involving a variety of procedures for the preparation of phosphors such as a washing procedure, a drying procedure and a sieving procedure.

The phosphor of the present invention prepared in accordance with the above-mentioned process is a phosphor having at least one metal element selected from the group consisting of Li, K, In, Al, Ga, Bi, Sm, Cu, Mg, Cs, Tl, Zn, Pb and Hf in addition to a cerium activated rare earth oxyhalide phosphor having the following formula (I):

LnOX:xCe  (I)

in which Ln is at least one rare earth element selected from the group consisting of Y, La, Gd and Lu; X is at least one halogen selected from the group consisting of Cl, Br and I; and x is a number satisfying the condition of $0 < x \leq 0.2$, a ratio between said Ln and said X satisfy the condition of $0.500 < X/Ln \leq 0.998$ by atomic ratio. This phosphor has a maximum peak of a stimulation spectrum of the phosphor is located at $\lambda$ which is a wavelength satisfying the condition of $550 \text{ nm} < \lambda < 700 \text{ nm}$.

Examples of the present invention are given below, but the examples are construed by no means to restrict the invention.

EXAMPLE 1

362.5 g (1 mol) of gadolinium oxide ($Gd_2O_3$) was dissolved in 0.516 l of 11.65 N HCl, then 0.493 g ($2 \times 10^{-3}$ mol) of cerium chloride ($CeCl_3$) and 0.746 g of KCl (0.01 mol) were added to the solution. To the resulting solution, 379 g of oxalic acid was added. The resulting precipitate was collected and fired at 1,000° C. for 3 hours in aerial atmosphere. 96.28 g (1.8 mol) of ammonium chloride ($NH_4Cl$) was added to the fired product, and the obtained mixture was fired at 500° C. for 3 hours in a weak reducing atmosphere of carbon monoxide. The mixture was cooled and further fired at 1,400° C. for 2 hours in a weak reducing atmosphere of carbon monoxide.

Thus, obtained was a cerium activated gadolinium oxychloride phosphor (GdOCl:$10^{-3}$ $Ce^{3+}$) to which 0.01 mol of K per 1 mol of Gd was added.

With respect to each of Li, In, Al, Ga, Bi, Sm, Cu, Mg, Cs, Tl, Zn, Pb and Hf, a cerium activated gadolinium oxychloride phosphor (GdOCl:$10^{-3}$ $Ce^{3+}$) to which 0.01 mol of the metal element was added per 1 mol of Gd was prepared in the same manner as described above.

Comparison Example 1

The procedure of Example 1 was repeated except for adding no metal element to obtain a cerium activated gadolinium oxychloride phosphor (GdOCl:$10^{-3}$ $Ce^{3+}$).

Reference Example 1

The procedure of Example 1 was repeated except for adding each of Ta, Sc, Ca, Ba, Mn and Yb to obtain cerium activated gadolinium oxychloride phosphors (GdOCl:$10^{-3}$ $Ce^{3+}$) to which 0.01 mol of the each metal element was added per 1 mol of Gd.

The ratio between Gd and Cl (Cl Gd) of each of the phosphors obtained in Example 1, Comparison Example 1 and Reference Example 1 satisfies the condition of $0.800 \leq Cl/Gd \leq 0.990$ by atomic ratio. The wavelength of the maximum peak of a stimulation spectrum ($\lambda$) of each of the phosphors is within the range of $550 \text{ nm} < \lambda < 700 \text{ nm}$.

Evaluation of Phosphor

1) Measurement of luminance of stimulated emission

Each of the phosphors was exposed to X-rays at 40 KVp, and after 5 minutes, excited with the light of 680 nm emitted from LED (light emitting diode). The stimulated emission emitted from the phosphor was detected by the photomultiplier to measure a luminance of stimulated emission.

The results are shown in Table 1, in which the values of luminances were relatively determined on the basis of the luminance of the phosphor of Comparison Example 1 to be set at 100.

2) Measurement of afterglow characteristics of stimulated emission

Each of the phosphors was exposed to X-rays at 40 KVp, and after 5 minutes, excited with the light of 680 nm emitted from LED (light emitting diode) for 30 msec using function generator. After the excitation, time-dependent variation of the intensity (i.e., decay) of the stimulated emission emitted from the phosphor was measured. The results were evaluated by the ratios of the intensities of 2 msec and 40 msec after the termination of excitation to the initial intensity (i.e., intensity of immediately after the termination of excitation). The results are set forth in Table 1. The values in Table 1 are the ratios of each intensities to the initial intensity expressed by common logarithms. For example, the numbers of "−2" and "−3" in Table 1 mean that the ratios are 1/100 and 1/1000, respectively.

TABLE 1

| Metal Element (0.01 mol/Gd 1 mol) | Luminance | Afterglow Characteristics 2 msec | 40 msec |
|---|---|---|---|
| Example 1 | | | |
| K | 220 | −2.4 | −4.7 |
| Sm | 210 | −3.2 | −4.8 |
| Cu | 170 | −3.4 | −5.2 |
| Bi | 180 | −3.2 | −5.3 |
| Li | 190 | −2.4 | −5.1 |
| Al | 150 | −3.0 | −5.0 |
| Mg | 140 | −2.6 | −5.1 |
| Ga | 120 | −3.5 | −5.9 |
| In | 100 | −3.4 | −5.8 |
| Cs | 80 | −3.4 | −4.4 |
| Tl | 60 | −3.4 | −4.9 |
| Zn | 60 | −3.1 | −4.6 |
| Pb | 40 | −3.4 | −5.2 |
| Hf | 30 | −2.8 | −4.8 |
| Comp. Example 1 | | | |
| — | 100 | −1.6 | −4.0 |
| Ref. Example 1 | | | |
| Ta | 120 | −1.6 | −2.8 |
| Sc | 30 | −0.82 | −1.4 |
| Ca | not more than 10 | −2.3 | −3.4 |
| Ba | not more than 10 | −3.2 | −5.5 |
| Mn | not more than 10 | −2.5 | −3.5 |
| Yb | not more than 10 | −2.4 | −4.2 |

EXAMPLE 2

The procedure of Example 1 was repeated except for adding $10^{-6}$ mol, $10^{-4}$ mol, $10^{-3}$ mol, $10^{-2}$ mol and $10^{-1}$ mol of Sm per 1 mol of Gd to obtain five kinds of cerium activated gadolinium oxychloride phosphors (GdOCl: b $10^{-3}$ $Ce^{3+}$) to which various amount of Sm was added.

EXAMPLE 3

The procedure of Example 1 was repeated except for adding $10^{-6}$ mol, $10^{-4}$ mol, $10^{-3}$ mol, $10^{-2}$ mol and $10^{-1}$ m Mg per 1 mol of Gd to obtain five kinds of cerium activated gadolinium oxychloride phosphors (GdOCl:$10^{-3}$ $Ce^{3+}$) to which various amount of Sm was added.

With respect to the phosphors of Example 2 and Example 3, the luminance of stimulated emission and the afterglow characteristics were measured. The results are shown in FIG. 1, in which the values of luminances are relatively determined on the basis of the luminance of the phosphor to which the metal element is not added to be set at 100 and the afterglow characteristics are evaluated by the ratio of the intensity of 2 msec after the termination of excitation to the initial intensity (expressed by common logarithms).

In FIG. 1, the abscissa is graduated in the amount of added metal element per 1 mol of Gd, and the left ordinate is for the afterglow characteristics (the left ordinate is graduated in the ratio of the intensity of 2 msec after the termination of excitation to the initial intensity expressed by common logarithms). The right ordinate in FIG. 1 is graduated in relative value determined on the basis of the luminance of the phosphor to which no metal element was added to be set at 100. In FIG. 1, "○" and "△" represent the luminance of Sm added phosphor and Mg added phosphor, respectively. "●" and "▲" also represent the afterglow characteristics of Sm added phosphor and Mg added phosphor, respectively.

As is evident from Table 1 and FIG. 1, the phosphor of the present invention is a cerium activated rare earth oxyhalide phosphor improved in the afterglow characteristics.

I claim:

1. A cerium activated rare earth oxyhalide phosphor having a crystal structure that is the same as PbFCl, wherein Ln, O and X are crystal matrix elements in which Ln is at least one rare earth element selected from the group consisting of Y, La, Gd and Lu; X is at least one halogen selected from the group consisting of Cl, Br and 1; and the quantity of Ce per mole of rare earth oxyhalide is represented by x, where x is a number satisfying the condition of $0<x \leq 0.2$, and a ratio between said Ln and said X satisfy the condition of $0.500<X/Ln \leq 0.998$ by atomic ratio; said phosphor exhibiting a stimulation spectrum having a maximum peak located at $\lambda$, which is a wavelength satisfying the condition of 550 nm$<\lambda<$700mm, said $\lambda$, being at a longer wavelength than the $\lambda$, of the phosphor as defined above except where X/Ln>0.998, which further contains at least one metal element selected from the group consisting of Li, K, In, Al, Ca, Bi, Sm, Cu, Mg, Cs, Tl, Zn, Pb and Hf, wherein said metal element is present in an amount of not more than 0.1 mol/mol Ln, but not less than $10^{-6}$ mol/mol Ln.

2. The phosphor as claimed in claim 1, in which the ratio between said Ln and said X satisfy the condition of $0.700<X/Ln \leq 0.995$ by atomic ratio.

3. The phosphor as claimed in claim 1, in which the ratio between said Ln and said X satisfy the condition of $0.800<X/Ln \leq 0.990$ by atomic ratio.

4. The phosphor as claimed in claim 1, in which Ln in the formula (I) is at least one rare earth element selected from the group consisting of Y, La and Gd; X is at least one halogen selected from the group consisting of Cl and Br.

5. The phosphor as claimed in claim 1, in which said metal element is at least one metal element selected from the Group consisting of Li, K, In, Al, Ga, Bi, Sm, Cu and Mg.

6. The phosphor as claimed in claim 1, in which the amount of said metal element is not more than $1 \times 10^{-1}$ mol per 1 mol of Ln.

7. The phosphor as claimed in claim 1, in which the amount of said metal element is not more than $4 \times 10^{-2}$ mol per 1 mol of Ln.

8. The phosphor as claimed in claim 1, in which the amount of said metal element is not less than $10^{-6}$ mol per 1 mol of Ln.

9. The phosphor as claimed in claim 1, in which the amount of said metal element is not less than $10^{-5}$ mol per 1 mol of Ln.

* * * * *